May 19, 1936.  O. W. SJOGREN ET AL  2,041,216
DISK HARROW
Filed June 2, 1933   3 Sheets-Sheet 1
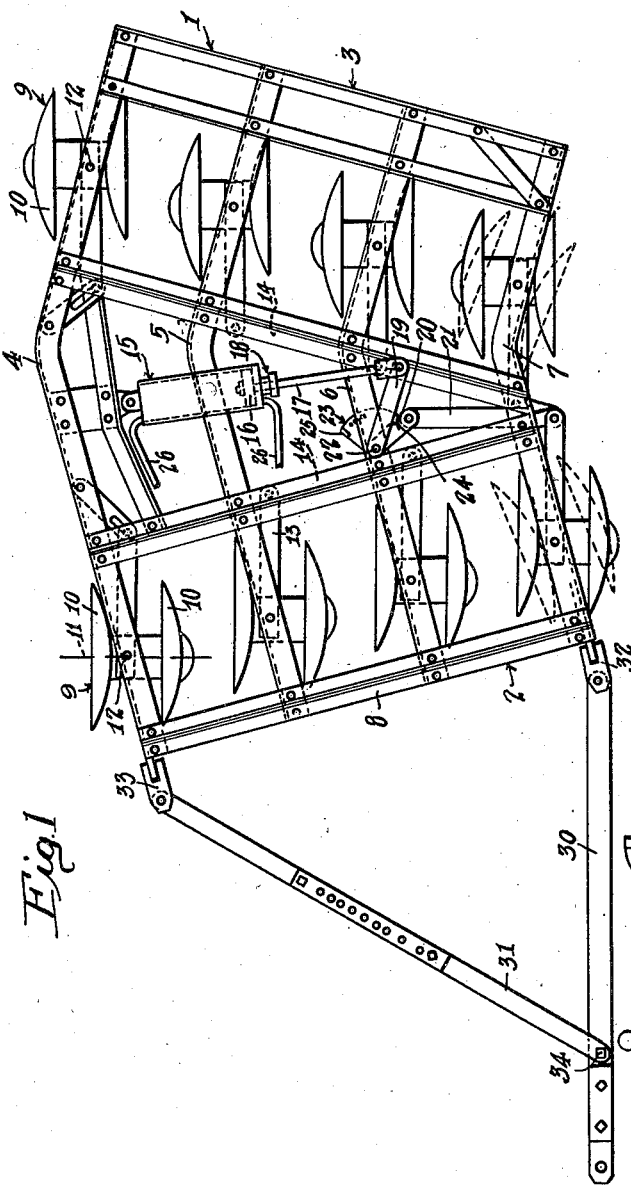
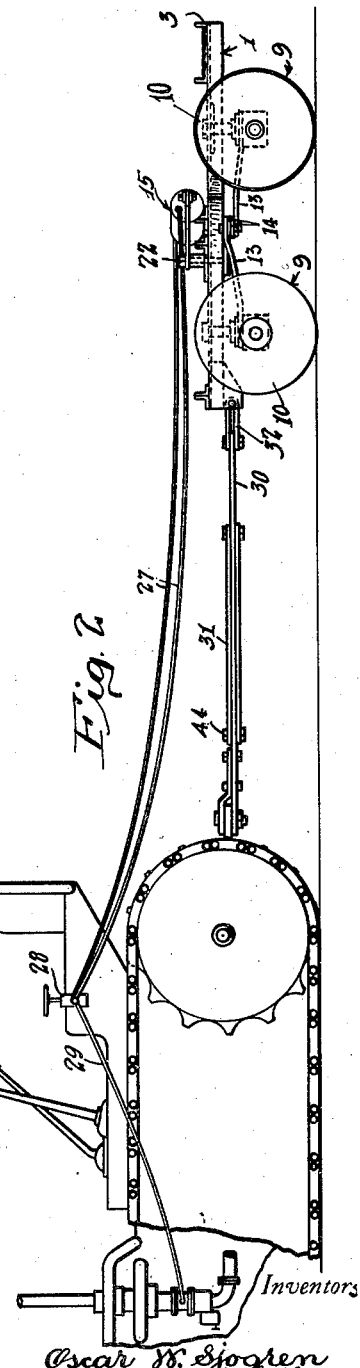
Inventors
Oscar W. Sjogren
Rollie H. Mitchell
Jesse A. Vaughn
Dougald E. Skinn
By
Attorney.

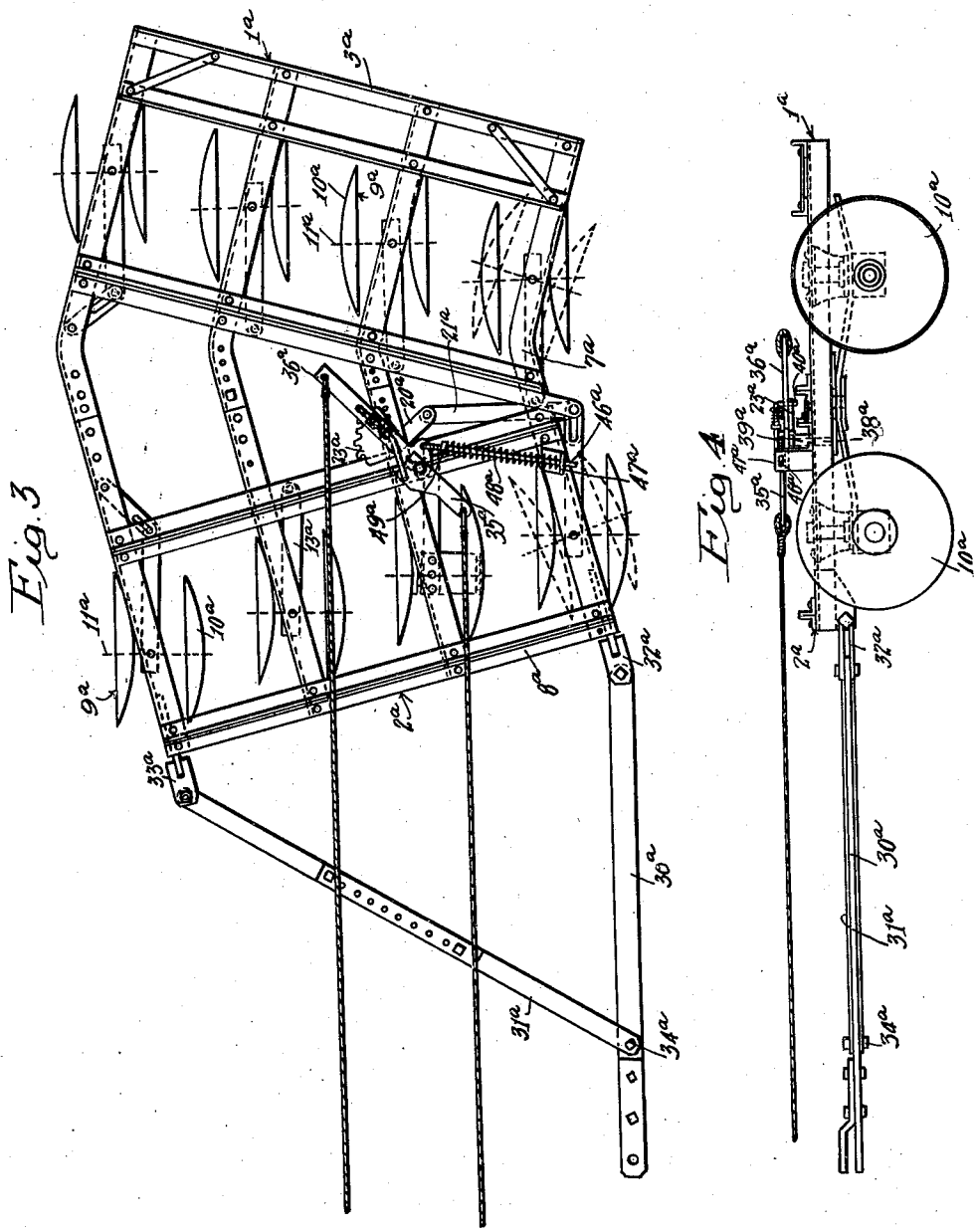

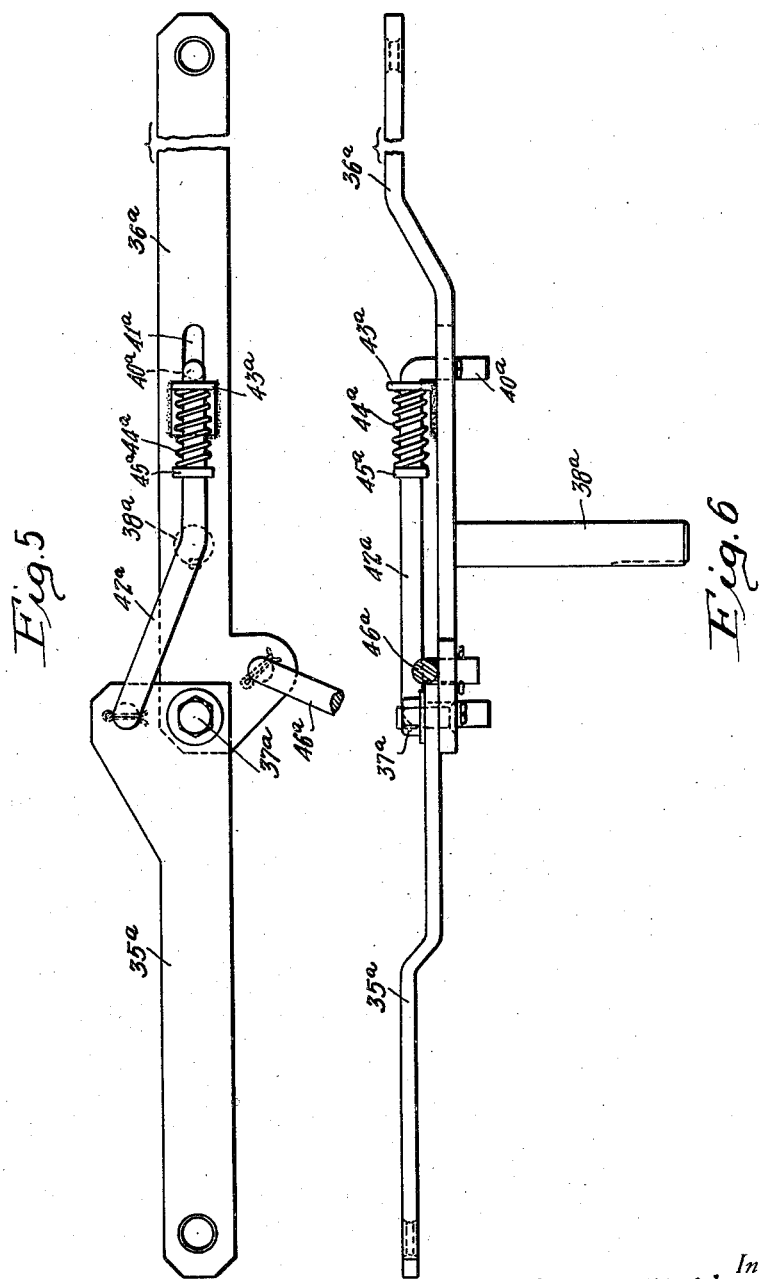

Patented May 19, 1936

2,041,216

UNITED STATES PATENT OFFICE 2,041,216

DISK HARROW

Oscar W. Sjogren, Huntington Park, Rollie H. Mitchell, South Gate, Jesse A. Vaughn, Los Angeles, and Dougald E. Skinn, South Gate, Calif., assignors to Killefer Manufacturing Corporation, Ltd., Los Angeles, Calif., a corporation of California Application June 2, 1933, Serial No. 673,956

10 Claims. (Cl. 55—30)

This invention relates to disk harrows and more particularly to an improvement over the form of disk harrow as illustrated in the Max M. Brodersen application for Disk harrow, Serial No. 643,425, filed November 19, 1932.

It is an object of this invention to provide a disk harrow of the single tandem type in which the front and rear gangs of disks will be held level during their operation, and which gangs of disks include a plurality of individual disk units which, when positioned in the ground working position rotate on substantially common axes.

Another object of this invention is to provide a disk harrow of the single tandem type, each of which gangs includes a plurality of units of disks, each of which units includes a plurality of disks, and which units are connected together so as to be rotated independently to and from working position within the gangs.

Another object of this invention is to provide a single tandem disk harrow including a front and a rear gang, each of which gangs includes a plurality of disks and means whereby the disks of the units may be moved to angled position with relation to the direction of travel of the harrow by means of a power cylinder operated from or by the vacuum produced in the intake manifold of a tractor to which the disk harrow is connected.

Another object of this invention is to provide a new and improved form of means for actuating the ground working elements of an agricultural tool.

Another object of this invention is to provide a disk harrow including a plurality of balanced units of disks which are connected with a power mechanism operated from the vacuum created in the intake manifold of the engine of a tractor for moving the disk units to and from angled or operating position.

Other objects and advantages of this invention it is believed will be apparent from the following detailed description of a preferred embodiment thereof as illustrated in the accompanying drawings.

In the drawings:

Figure 1 is a top plan view of the disk harrow embodying our invention.

Figure 2 is a side elevation thereof.

Figure 3 is a top plan view of the modified form of structure embodying our invention.

Figure 4 is a side elevation of the modified form of the structure embodying our invention.

Figure 5 is a detached enlarged view of the angling trip device embodying the modified form of our invention.

Figure 6 is a side elevation of the structure illustrated in Figure 5.

In the embodiment of our invention as illustrated in Figures 1 and 2, 1 indicates a frame which frame is of rigid construction and is what may be termed a V-type frame in that it includes a front gang frame 2 and a rear gang frame 3 connected together in angled or V-relation by means of connecting angles 4, 5, 6 and 7 which hold front and rear frames 2 and 3 rigidly and in definite angled relation. The front and rear gang frames 2 and 3 are formed of transversely extending angle members 8 which extend transversely of the frame 1, and these transverse angle members 8 are connected together by means of the connecting angle members 4, 5, 6 and 7.

Mounted within the front and rear gang frames 2 and 3 are disk units 9, each of which unit includes a plurality of concavo-convex disks 10 mounted upon a unit gang rod 11 in any suitable or desirable manner such, for example, as is specifically illustrated and set forth in the copending application of Max M. Brodersen, Serial No. 643,425, above referred to.

The disk units are herein illustrated as including two disks 10 mounted upon a common shaft having an axis of rotation 11 and the shaft is pivotally supported on vertical pivots 12 in such a manner that each disk unit may be swung independently to or from its angled position. The pivots 12 are positioned with reference to the disks 10 offset from the center of the structure so that the action of the soil against the disks will tend to rotate the disk units either to or out of cutting or angled position, depending upon the particular structure or the pivots 12 are positioned off center in such position as to cause the disk units to become balanced so that they will remain in the position adjusted independently of the thrust of the soil against them when they are run through the ground.

Under some conditions it is desirable to balance the units in the manner described so that means may be provided for actuating the disk units to or from angled position with a minimum of effort or power. In other instances it is desirable to pivotally mount the disk units on the pivots 12 in offset position such that the thrust of the soil against the concavo-convex disk will tend either to move the disks into or out of angled position.

The disk units are connected with angling bars 13 which extend to the center of the frame 1 and are there connected to transversely actuated bars 14, which bars 14 are connected to a means for forcing the units of disks into and out of angled position, which means will be specifically hereinafter set forth.

In the structure as thus set forth, the disk units when angled to their maximum angled position will all rotate around a common axis so that neither the front nor rear edges of the disks of the respective units are more closely positioned together than their opposite edges. In this way "balling up" of the disks is avoided.

When the disks are moved to the non-cutting or non-angled position as illustrated in full lines in Figure 1, they then rotate around spaced but substantially parallel axes of rotation. However, when angled to the dotted line position, their axes of rotation for the disks of each of the front and rear gangs are common, or substantially so or are in straight lines.

In order to provide mechanism for the operation of the disk units for either moving the disk units to or from angled position, we prefer to mount upon the frame 1 a cylinder 15 in which a piston 16 is mounted.

The piston 16 is mounted upon the end of a piston rod 17, which piston rod extends through a stuffing box 18 and is connected with a lever 19. The lever 19 is in turn connected with a lever 20 which is linked by means of a link 21 to the transversely moving bars 14. The lever arrangement provided by the levers 19 and 20 is such as to permit a compounding of the force created within the cylinder 15 against the piston 16 to move the disk units into and out of angled position.

The levers 19 and 20 are secured to a common shaft 22 which is journaled in a bearing supported by the frame member 6. Mounted upon the frame member 6 is a stop segment 23 which stop segment 23 is provided with limit stops 24 and 25, one of which stops, for example the stop 25, may be adjustably positioned upon the stop segment 23 to adjust the limit to which the disk units may be angled. In order to actuate the piston 16 and hence the disk units in either direction, the cylinder 15 is connected so that a pressure influence may be imposed upon either side of the piston 16 and for this purpose is provided with two inlets or outlets 26 to which flexible hoses 27 are connected. The flexible hoses 27 extend forwardly from the implement and are secured to the inlets of a four-way valve 28 which is mounted upon the tractor to which the implement is connected.

The four-way valve is in turn connected by means of a hose or other conduit connection 29 with the manifold of the engine of the tractor. We have found that the vacuum or reduced pressure created from the operation of the engine of a tractor may be thus utilized for the purpose of angling the disks to or from angled position, and may thus be utilized as a source or means by which the working tools of agricultural implements may be actuated to and from their ground engaging or working position.

Secured to the forward end of the frame 1 is a hitch which includes a hitch bar 30 and an offset hitch bar 31. The hitch bar 30 is secured by means of a clevis 32 to the frame 1 at one side and the offset bar 31 is secured by means of a clevis 33 to the opposite side of the frame 1. The offset bar 31 is adjustable in length to provide for the degree of offset to which it is desired to actuate the single tandem disk harrow. The offset bar 31 is pivotally secured to the hitch bar 30 by means of a pivot bolt 34. The forward end of the hitch bar 31 is formed to permit its attachment to the draw bar of a tractor.

The four-way valve utilized in the connection between the manifold of the engine and the cylinder 15 may be of any suitable or desirable construction and provides the means by which the vacuum influence may be transferred from side to side of the piston 16 to thus force the disk unit either into or out of angled position. The operation of the vacuum cylinder for the purpose of actuating the disk units has been specifically described in connection with balanced disk units. It is however understood that it is equally operable in case the disk units are moved out of balanced position so that the tendency of the forward movement of the harrow and the resistance set up between the soil and the disks causes the disks to move in one direction while the vacuum cylinder may be utilized to return the disks to the offset position.

The modified form of structure embodied in our invention as illustrated in Figures 3 to 6, inclusive, is similar in all respects to that heretofore described with the exception of the means provided for actuating the disks to or from angled position, and in this modified form of structure similar parts have been designated with similar numerals with the addition of an exponent "a".

The actuating mechanism for moving the disk units to and from angled position in this modified form of structure includes a pair of connected actuating arms 35ᵃ and 36ᵃ which are pivotally connected by means of a pivot bolt 37ᵃ. The outer ends of the actuating arms 35ᵃ and 36ᵃ are connected with ropes or other flexible connections which extend forwardly to the tractor or other draft implement. A trunnion 38ᵃ is secured to the actuating arm 36ᵃ and the two actuating arms are pivotally supported by this trunnion in the supporting bearing 39ᵃ secured to the connecting frame member 6ᵃ. The lever 20ᵃ is secured to the trunnion 38ᵃ and is likewise secured to the link 21ᵃ.

In this modification of our invention the segment 23ᵃ is in the form of a ratchet and a ratchet pin 40ᵃ is carried in a slot 41ᵃ formed in the actuating arm 36ᵃ. The ratchet pin 40ᵃ is formed as a downward extension of the ratchet pin bar 42ᵃ which is pivotally connected in position offset from the pivot bolt 37ᵃ with the actuating arm 35ᵃ. The ratchet pin bar 42ᵃ is supported to slide within a bracket 43ᵃ secured to the actuating arm 36ᵃ.

A spring 44ᵃ is mounted on the ratchet pin bar 42ᵃ between a stop member 45ᵃ and the bracket 43ᵃ to normally urge the ratchet pin 40ᵃ in position to engage the ratchet 23ᵃ and to thereby hold the actuating arms 36ᵃ and 35ᵃ in their adjusted position.

The actuating arm 35ᵃ is actuated to move the disk units into angle and when actuated by means of its actuating rope, pivots around the pivot bolt 37ᵃ to release the ratchet pin 40ᵃ from the ratchet 23ᵃ, thereby permitting rotation of the actuating arms 35ᵃ and 36ᵃ and hence the movement of the disk units into angle. On actuation of the actuating arm 36ᵃ, the ratchet pin 40ᵃ merely slides over the ratchet 23ᵃ and the trunnion 38ᵃ is rotated in a direction to move the disk units out of angled position.

In order to aid the operator in moving the disk units into angled position against the tendency of the disks to move out of angled position, we prefer to incorporate in the actuating mechanism a booster structure which may include a booster rod 46ª which is slidably supported in a bracket 47ª secured to the end frame member 7ª and at its opposite end is pivotally secured to the actuating arm 35ª.

A spring 48ª under compression is mounted on the rod 46ª between the bracket 47ª and an adjustable stop member 49ª threadedly mounted upon the rod 46ª. The normal urge created by the spring 48ª is to rotate the actuating arm 35ª in a direction to rotate the trunnion 38ª to cause the disk units to be angled to a greater angled position.

Having fully described our invention, it is to be understood that we do not wish to be limited to the details herein set forth, but our invention is of the full scope of the appended claims.

We claim:

1. In a disk harrow, the combination of a frame composed of a pair of frame sections rigidly connected together in angled relation, a plurality of disks shiftably mounted in each frame to form front and rear gangs of disks, and means for shifting the disks with relation to the frame sections to and from angled positions, the disks being mounted in said frame sections so that when the disks are angled their axes of rotation correspond substantially with the angularity of said frame sections and in each gang lie in substantially a straight line.

2. In a disk harrow, the combination of a frame, a plurality of units of disks mounted in the frame to form a front and rear gang of disks, the units of disks being movably mounted in the frame to permit movement into working and non-working positions so that their axes of rotation in non-working position are perpendicular to the line of travel of the harrow and in each gang are parallel and progressively advanced one in front of the other from side to side of the gangs and in opposite sequence in the front and rear gangs, and so that when the disks are moved to working position their axes of rotation in each gang are substantially aligned.

3. In a disk harrow, the combination of a front gang of disks, a rear gang of disks, each of said gangs of disks including a plurality of units of disks movable into working and non-working positions, each of which units includes a plurality of disks, and means for mounting each unit of disks so that their axes are parallel and spaced longitudinally in non-working position, and means for rotating the units to a working position so that their axes of rotation are substantially in alignment.

4. In a disk harrow, the combination of a frame, including front and rear disk gang frame sections connected together in normally angled relation, disk gangs mounted in each frame section, each of said disk gangs including a plurality of movably mounted disks movable into working and non-working positions, means for mounting the disks in said gangs so that their axes of rotation are all substantially parallel with the sides of the angle at which the frame sections are mounted when in working position, and means for moving the disks so that their axes of rotation in non-working position are angled with relation to the frame sections.

5. In a disk harrow, the combination of a frame composed of front and rear gang sections angled apart, disk gangs shiftably carried by the gang frame sections, the disks of said disk gangs being shiftable into working and non-working positions, and means for angling the disk gangs with relation to said frame sections, the disks being mounted in said gangs so that the axes of the disks of each gang are substantially parallel when in non-working position and are substantially in alignment in each gang when in working position.

6. In a disk harrow, the combination of a frame, a plurality of disk units mounted in fore and aft relation in said frame, each of which disk units includes a plurality of disks, means for shiftably mounting the disk units in the frame to permit the units to be shifted into non-working positions, the disk units being mounted in said frame so that the axes of rotation of the disks of each gang are substantially parallel but spaced horizontally and substantially perpendicular to the line of draft of the harrow when the disks are in non-working position.

7. In a disk harrow, the combination of a frame, a plurality of disk units mounted in the frame to form a front gang of disks and a rear gang of disks, means for pivotally mounting the disk units in each gang to permit said units to swing to and from working position, the disk units being mounted so that the axes of rotation of the disks are substantially parallel but spaced apart horizontally when in non-working position, and so that the units of disks have their axes of rotation in each gang in substantial alignment when in working position.

8. In a disk harrow, the combination of a frame, a plurality of disk units mounted in the frame to form a front gang of disks and a rear gang of disks, means for pivotally mounting the disk units in each gang to permit said units to swing to and from working position, the disk units being mounted so that the axis of rotation of the disks are substantially parallel but spaced apart horizontally when in non-working position, and so that the units of disks have their axes of rotation in each gang in substantial alignment when in working position, and means for holding the disk units with their axes in the said working and non-working positions.

9. In a disk harrow, the combination of a frame including a front gang section and a rear gang section and means for connecting said sections together in angled relation, disk units shiftably mounted in each gang to permit said units to be moved to working and non-working positions, each of said units including a plurality of disk members and the disk units being mounted in said gang sections so that their axes of rotation are in substantial alignment when in working position in each gang and substantially parallel when in non-working position.

10. In a disk implement, the combination of a frame, a plurality of disk units mounted in the frame in V-shape to form front and rear gangs, each unit including a plurality of disks and each unit being shiftably mounted in said frame to move to working or non-working position, the disk units being mounted in said frame so that their axes of rotation are in substantial alignment when shifted to working position.

OSCAR W. SJOGREN.
ROLLIE H. MITCHELL.
JESSE A. VAUGHN.
DOUGALD E. SKINN.